(12) United States Patent
Wissner et al.

(10) Patent No.: US 7,575,278 B2
(45) Date of Patent: Aug. 18, 2009

(54) SEAT BACKS FOR VEHICULAR SEATS

(75) Inventors: Dan Wissner, Madison Heights, MI (US); Mike Hard, Ann Arbor, MI (US); Doug Krueger, Macomb, MI (US); Katsuhito Yamauchi, Novi, MI (US); Yukihide Hamajima, Toyota (JP); Satoshi Nonoyama, Toyota (JP); Tomoki Nii, Kasugai (JP)

(73) Assignees: Toyota Boshoku Kabushiki Kaisha, Aichi-Ken (JP); Toyota Boshoku America, Inc, Novi, MI (US)

( * ) Notice: Subject to any disclaimer, the term of this patent is extended or adjusted under 35 U.S.C. 154(b) by 0 days.

(21) Appl. No.: 11/875,255

(22) Filed: Oct. 19, 2007

(65) Prior Publication Data

US 2009/0102258 A1 Apr. 23, 2009

(51) Int. Cl.
*A47C 3/027* (2006.01)
(52) U.S. Cl. ............... 297/284.4; 297/284.2; 297/284.8
(58) Field of Classification Search .............. 297/284.4, 297/284.2, 284.8
See application file for complete search history.

(56) References Cited

U.S. PATENT DOCUMENTS

| | | | | |
|---|---|---|---|---|
| 5,044,693 A * | 9/1991 | Yokota | ................... | 297/452.18 |
| 5,518,294 A * | 5/1996 | Ligon et al. | ............... | 297/284.4 |
| 5,577,811 A * | 11/1996 | Ogg | ....................... | 297/452.15 |
| 6,296,308 B1 | 10/2001 | Cosentino et al. | | |
| 6,955,399 B2 * | 10/2005 | Hong | ...................... | 297/284.4 |
| 7,011,369 B2 | 3/2006 | Massara et al. | | |
| 7,032,971 B2 * | 4/2006 | Williams | ................... | 297/284.4 |
| 7,052,087 B2 * | 5/2006 | McMillen | ................. | 297/284.4 |
| 7,083,233 B2 * | 8/2006 | Massara et al. | .......... | 297/284.4 |
| 7,097,247 B2 * | 8/2006 | Battey et al. | ............. | 297/284.4 |
| 7,140,681 B2 * | 11/2006 | McMillen | ................. | 297/284.9 |
| 7,165,810 B2 * | 1/2007 | McMillen | ................. | 297/284.4 |
| 7,201,446 B2 * | 4/2007 | Massara et al. | ........... | 297/284.4 |
| 7,270,374 B2 * | 9/2007 | Moriggi | .................... | 297/284.4 |
| 7,290,837 B2 * | 11/2007 | Sugiyama et al. | ....... | 297/452.55 |
| 7,328,950 B2 * | 2/2008 | McMillen et al. | ......... | 297/284.4 |

(Continued)

FOREIGN PATENT DOCUMENTS

JP 2003-341401 12/2003

(Continued)

OTHER PUBLICATIONS

English language Abstract of JP 2003-341401.

(Continued)

*Primary Examiner*—Laurie K Cranmer
(74) *Attorney, Agent, or Firm*—Greenblum & Bernstein, P.L.C.

(57) ABSTRACT

A seat back for a vehicular seat has a plate member for supporting a back of a pad and an elastic support mechanism for holding the plate member for moving the plate member in a forward and backward direction. The plate member includes a thoracic vertebra avoiding portion having at least one of a hole and a recessed portion recessed in a direction away from the thoracic vertebrae of a user, so as to avoid a pushing force to the thoracic vertebrae. In addition the thoracic vertebra avoiding portion is vertically elongated at a substantially widthwise center position of the plate member and has a width of 40 to 100 mm.

8 Claims, 6 Drawing Sheets

U.S. PATENT DOCUMENTS

| | | | |
|---|---|---|---|
| 7,425,036 B2* | 9/2008 | McMillen | 297/284.4 |
| 2004/0080197 A1* | 4/2004 | Kopetzky | 297/284.4 |
| 2004/0108760 A1* | 6/2004 | McMillen | 297/284.4 |
| 2006/0232114 A1 | 10/2006 | Sugiyama et al. | |
| 2007/0228790 A1* | 10/2007 | Schurg et al. | 297/284.4 |
| 2008/0129097 A1* | 6/2008 | Kowal et al. | 297/284.4 |

FOREIGN PATENT DOCUMENTS

JP    2006-20733    1/2006

OTHER PUBLICATIONS

English language Abstract of JP 2006-20733.
U.S. Appl. No. 11/876,919 to Wissner et al., filed Oct. 23, 2007.

* cited by examiner

FIG. 6 ns of the user is shaped on its two transverse sides so as to avoid the scapu-

SEAT BACKS FOR VEHICULAR SEATS

BACKGROUND OF THE INVENTION

1. Field of the Invention

The present invention relates to a seat back for a vehicular seat.

2. Description of the Related Art

The seat back for the vehicular seat generally includes a seat back frame and a pad. Moreover, the seat back of the type having a thin pad further includes a plate member for supporting the back of the pad, and an elastic support mechanism for holding the plate member elastically and movably forward and backward relative to the seat back frame. One example of a plate member is disclosed in U.S. Pat. No. 6,296,308 (308 patent), for example.

Here, the thoracic vertebrae of a user seated on a vehicular seat are bent to bulge toward the seat back. Moreover, the seat back of the thin pad type has a tendency for the plate member to apply a strong pushing force to the thoracic vertebrae. This can result in a more uncomfortable ride. For example, the plate member disclosed in FIG. 2 of the 308 patent applies a strong pushing force to the thoracic vertebrae with the portion of the plate member matching the thoracic vertebrae. The plate member disclosed in FIG. 10 of the 308 patent has a slot at the widthwise center, but this slot is less wide than the thoracic vertebrae as it is considered that a sitting position is not always at the center of the seat's width. As a result, this plate member also applies the strong pushing force to the thoracic vertebrae.

Thus, there is a need in the art for a seat back for a vehicular seat, which is provided with a plate member for reducing or eliminating strong pushing force to the thoracic vertebrae of a user.

SUMMARY OF THE INVENTION

One aspect of the present invention can include a seat back for a vehicular seat having a plate member for supporting a back of a pad and an elastic support mechanism for holding the plate member and moving the plate member in a forward and backward direction. The plate member includes a thoracic vertebra avoiding portion having at least one of a hole and a recessed portion recessed in a direction away from the thoracic vertebrae of a user, so as to avoid a pushing force to the thoracic vertebrae. In addition the thoracic vertebra avoiding portion is vertically elongated at a substantially widthwise center position of the plate member and has a width of 40 to 100 mm.

Therefore, the plate member is so constituted by the open hole and/or the recessed portion as not to apply a strong pushing force to the thoracic vertebrae of the user. Moreover, the thoracic vertebra avoiding portion 3f is vertically elongated at the substantially widthwise center position, and is given the width of 40 to 100 mm. Therefore, the strong pushing force to the thoracic vertebrae of the user can be sufficiently suppressed to improve the riding comfortableness of the vehicular seat.

DETAILED DESCRIPTION OF THE INVENTION

Each of the additional features and teachings disclosed above and below may be utilized separately or in conjunction with other features and teachings to provide improved seat backs for vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
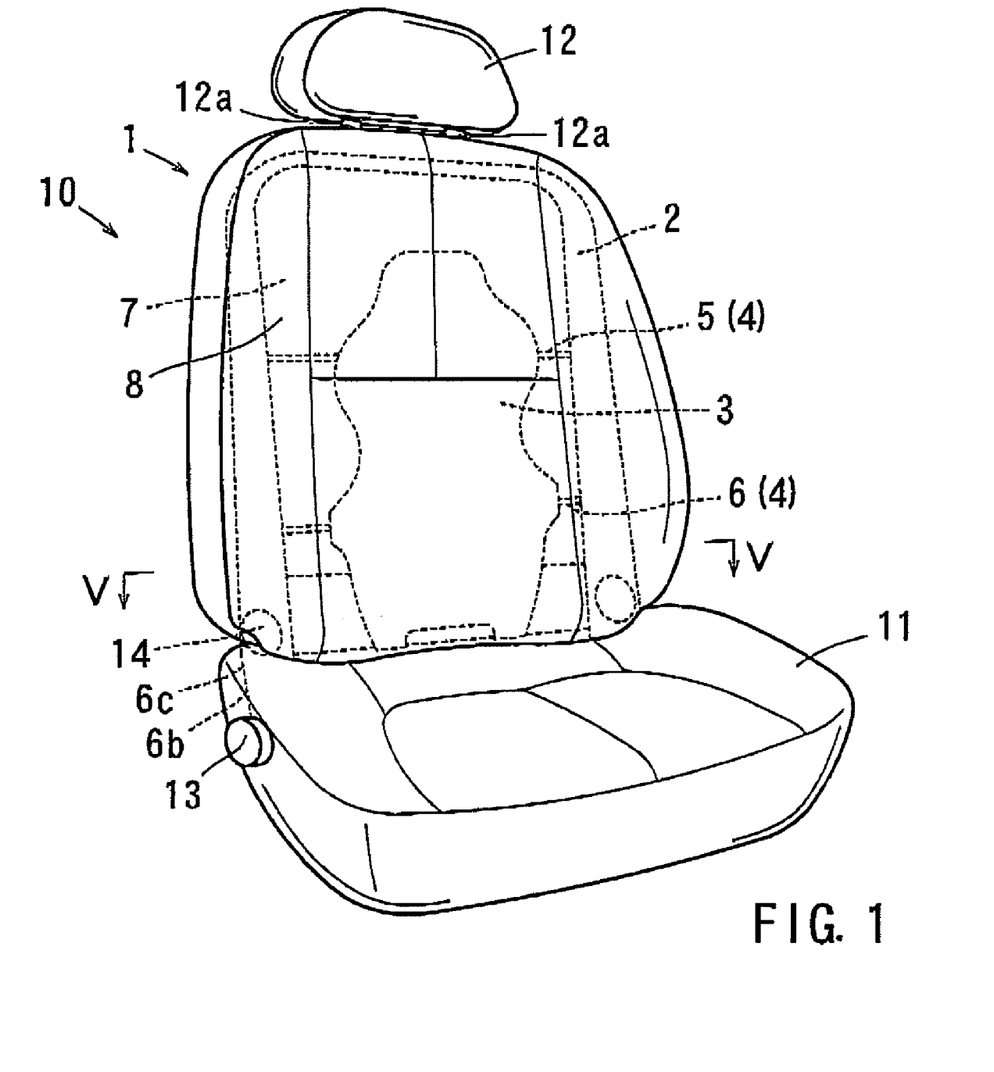
FIG. 1 is a perspective view of a seat for a vehicle.

A configuration of the present invention is described with reference to FIGS. 1 to 6. As shown in FIG. 1, a vehicular seat 10 comprises a seat cushion 11 for seating a user, and a seat back 1 for supporting the back of the user. Between the seat cushion 11 and the seat back 1, there are interposed reclining devices 14 for reclining the seat back 1 against the seat cushion 11. A headrest 12 for supporting the head of the user is attached to and is vertically movable in relation to the upper portion of the seat back 1.

Figure 2:
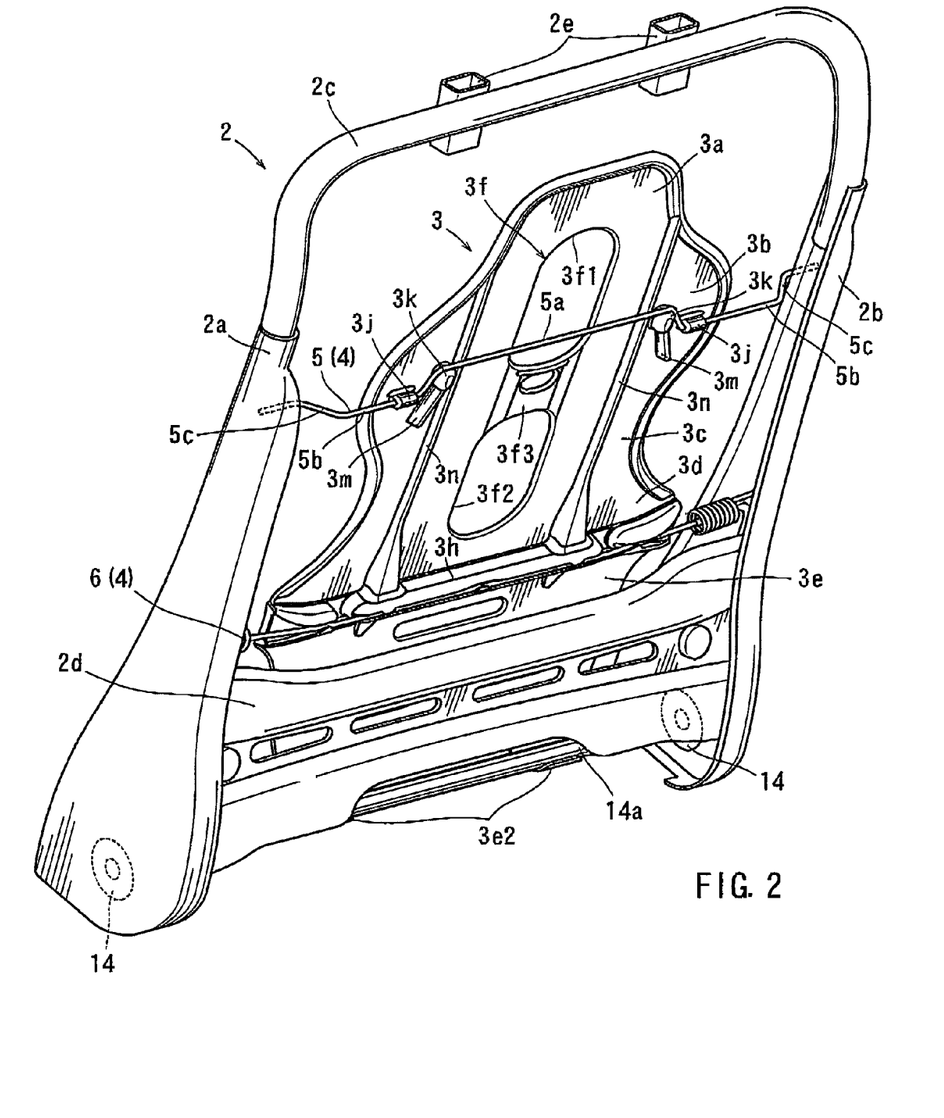
FIG. 2 is a perspective view of a back of a seat back frame, a plate member and an elastic support mechanism.

As shown in FIG. 1, the seat back 1 can include a seat back frame 2, a pad 7, a plate member 3 for supporting the back side of the pad 7, and an elastic support mechanism 4 for holding the plate member 3 elastically against the seat back frame 2. As shown in FIG. 2, the seat back frame 2 can have a rectangular shape and be composed of left and right side frames 2a and 2b, an upper frame 2c and an under frame 2d.

Figure 5:
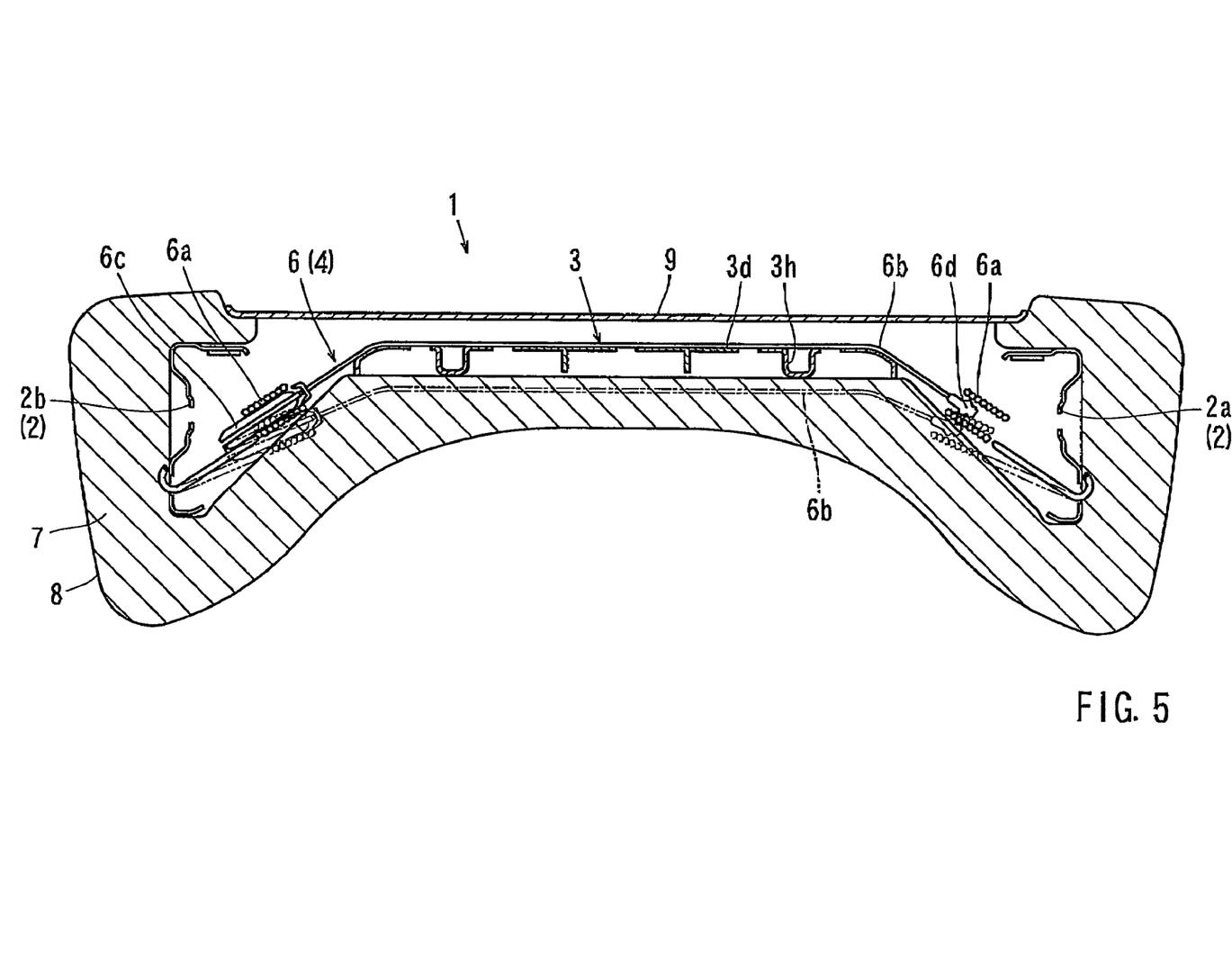
FIG. 5 is a cross-sectional view taken along line V-V in FIG. 1.

The upper frame 2c is equipped with a pair of cylinder portions 2e, as shown in FIG. 2. The headrest 12 includes stays 12a (as referred to FIG. 1) so inserted into the cylinder portions 2e as can be adjusted in vertical positions. The pad 7 can be formed of an elastically deformable material such as foamed urethane. Moreover, the pad 7 has a predetermined thickness, as shown in FIG. 5, and covers the front side and the side faces of the seat back frame 2. The pad 7 has its surface covered with a surface member 8.

Figure 3:
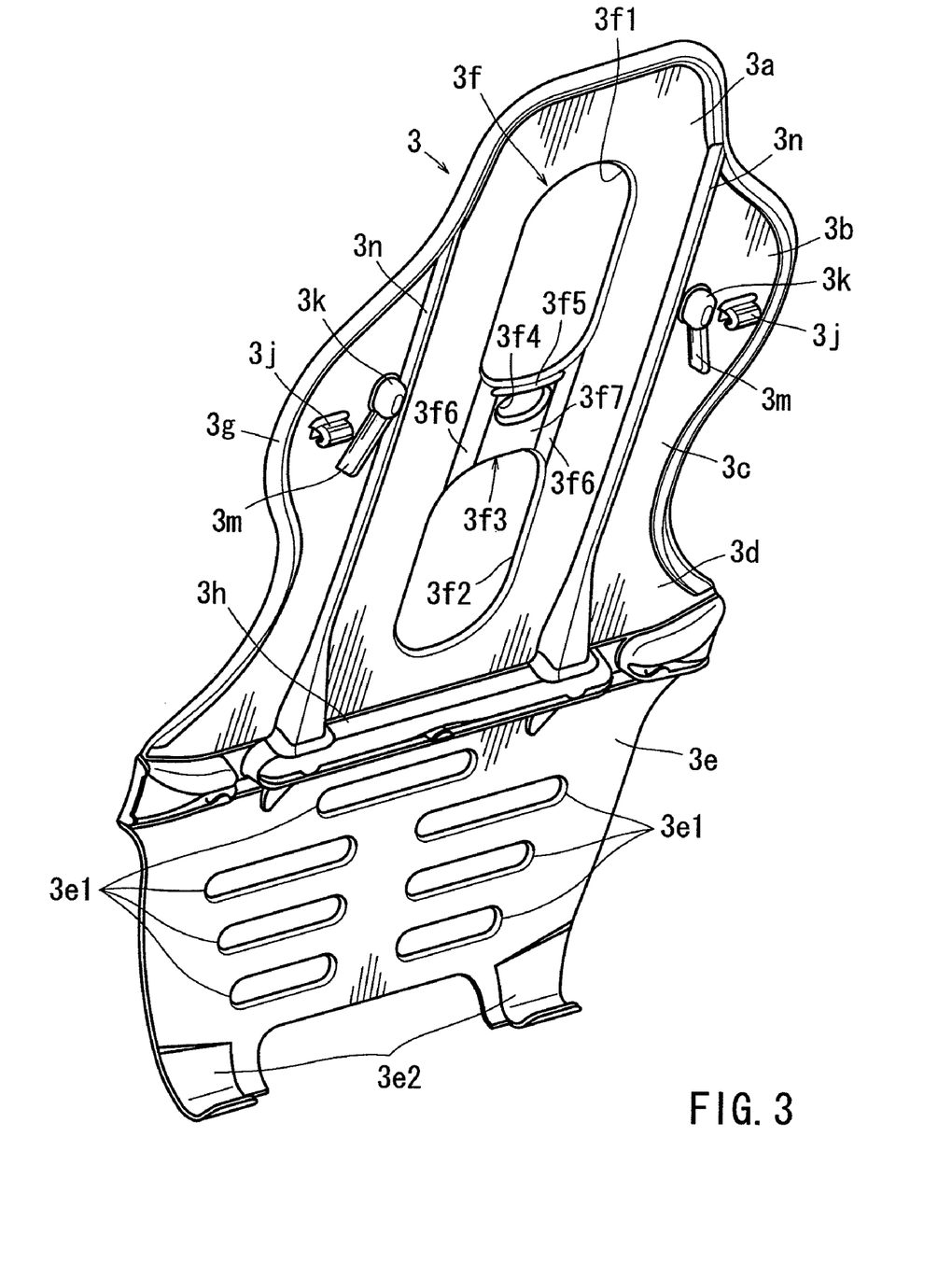
FIG. 3 is a perspective view of a back of the plate member.

The plate member 3 is made smaller than the seat back frame 2, as shown in FIG. 1, and is arranged on the back side of the pad 7. The plate member 3 is molded of a composite material composed mainly of a resin and glass fibers. The resin may be a polyamide resin such as nylon 6 (PA6). The glass fibers have a weight of 10 to 20 wt. % of the total weight of the composite material. The plate member 3 is formed into a plate shape having a thickness of about 2 mm. As shown in FIG. 3, moreover, the plate member 3 can be defined by plate portions 3a to 3e, and by having a left-right symmetric shape.

Figure 4:
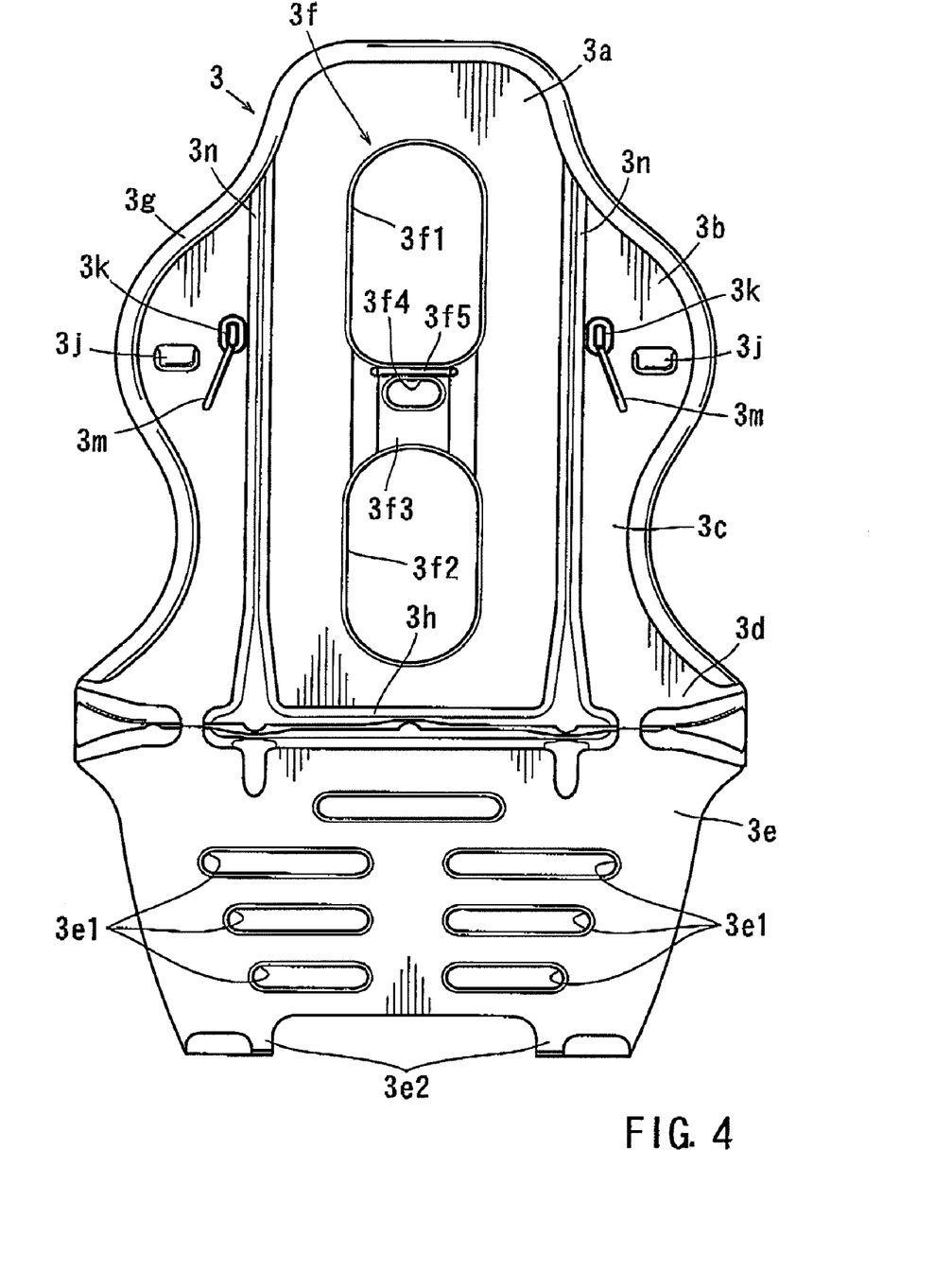
FIG. 4 is a rear view of the plate member.

The first plate portion 3a is arranged at a height approximately matching or proximate to a scapulae of an adult user, as shown in FIGS. 3 and 4. Moreover, the first plate portion 3a is shaped on its two transverse sides so as to avoid the scapulae, and therefore it is more narrow than the remaining plate portions 3b to 3e. The first plate portion 3a has a width of 40 to 60% of that of the second plate portions 3b, for example. The third plate portion 3c is arranged at a height matching the kidneys of the user. Moreover, the third plate portion 3c is shaped on its two transverse sides so as to avoid a kidney of a user, and therefore it is more narrow than the second plate portion 3b. The third plate portion 3c has a width that is 70 to 90% of a width of the second plate portion 3b, for example.

The fourth plate portion 3d is arranged at a height approximately matching or proximate to the lumbar of the user, thus being wider than the remaining plate portions 3a to 3c and 3e. The fourth plate portion 3d has a width 140 to 160% of a width of the third plate portion 3c, for example. The fifth plate portion 3e is arranged at a height approximately matching or proximate to the pelvis of the user, and is tapered to be narrow in a downward direction.

The plate member 3 has a thoracic vertebra avoiding portion 3f formed at its widthwise center position, as shown in FIGS. 3 and 4. The thoracic vertebra avoiding portion 3f is formed at such a position of the backbone of the user as corresponds to the thoracic vertebrae, and is vertically elongated from the lower side portion of the first plate portion 3a to the upper side portion of the fourth plate portion 3d. The thoracic vertebra avoiding portion 3f is wider than the thoracic vertebrae, thus having a width of 40 to 100 mm, preferably 50±10 mm. The thoracic vertebra avoiding portion 3f further defines holes 3f1 and 3f2 and a recessed portion 3f3.

The open holes 3f1 and 3f2 are defined at the upper and lower positions of the thoracic vertebra avoiding portion 3f, as shown in FIGS. 3 and 4, and extend through the plate member 3 in the thickness direction. The upper open hole 3f1 extends from the lower side portion of the first plate portion 3a to the general center of the second plate portion 3b. The lower open hole 3f2 extends vertically across the third plate portion 3c to the upper side portion of the fourth plate portion 3d.

The recessed portion 3f3 is positioned between the open holes 3f1 and 3f2, as shown in FIGS. 3 and 4. The recessed portion 3f3 has slope portions 3f6, formed on the two transverse sides, and sloped obliquely backward away from the thoracic vertebrae, and a bottom portion 3f7 connecting the slope portions 3f6. The recessed portion 3f3 has a depth of 5-10 mm, for example. The recessed portion 3f3 is so positioned on the lower side of the second plate portion 3b as to connect the lower left portion and the lower right portion of the second plate portion 3b. As a result, the recessed portion 3f3 prevents the open holes 3f1 and 3f2 from being largely opened to the left and right when the plate member 3 is deformed.

Moreover, the recessed portion 3f3 is positioned, as shown in FIG. 2, between elastic bridge members 5 and 6 of the elastic support mechanism 4. As a result, in case the plate member 3 receives a strong force backward between the elastic bridge members 5 and 6, the open hole 3f2 can be prevented from being largely opened to the left and right by the recessed portion 3f3. As shown in FIGS. 3 and 4, the recessed portion 3f3 is provided with a through hole 3f4 and a rib 3f5. The through hole 3f4 is transversely long, and the rib 3f5 is transversely long at the upper side position of the through hole 3f4.

As shown in FIGS. 3 and 4, ribs 3g, 3h and 3n are formed on the back of the plate member 3. The rib 3g is formed on the outer periphery of the upper side of the plate member 3, that is, on the outer peripheral edges of the first to fourth plate portions 3a to 3d. The rib 3h is transversely extended and formed on the back of the fourth plate portion 3d. As shown in FIG. 2, the lumbar elastic bridge member 6 of the elastic support mechanism 4 is inserted into the rib 3h. A gap of 20±10 mm is formed between the rib 3h and the open hole 3f2 so that the open hole 3f2 has no contact with the rib 3h. As a result, the plate member 3 rigidity is enhanced, and the concentration of stress is reduced or eliminated in the vicinity of the end portion of the open hole 3f2.

The ribs 3n are vertically extended, as shown in FIG. 4, and formed on the two transverse sides of the thoracic vertebra avoiding portion 3f. The upper end portions of the ribs 3n reach the ribs 3g of the first plate portion 3a, and the lower end portions extend downward to the rib 3h.

The fifth plate portion 3e has a plurality of openings 3e1 formed, as shown in FIGS. 3 and 4. These openings 3e1 are made transversely long, and are arranged vertically in plurality. Moreover, the fifth plate portions 3e has no rib formed on its outer periphery. As a result, the fifth plate portion 3e is made deformable in the thickness direction and light in weight. A pair of pawls 3e2 are formed at the lower end portion of the fifth plate portion 3e. The pawls 3e2 can be hooked on a shaft member 14a, as shown in FIG. 2. The shaft member 14a interlocks the left and right reclining devices 14.

As shown in FIG. 2, the elastic support mechanism 4 includes a pair of the elastic bridge members 5 and 6, which are horizontally bridged on the seat back frame 2. The elastic bridge member 5 is an elastic rod-shaped member made of a metal, and is attached to the back of the second plate portion 3b. The elastic bridge member 5 includes a bent portion 5a at its center. And horizontal portions 5b and end portions 5c are provided on the two sides of the bent portion 5a.

Figure 6:
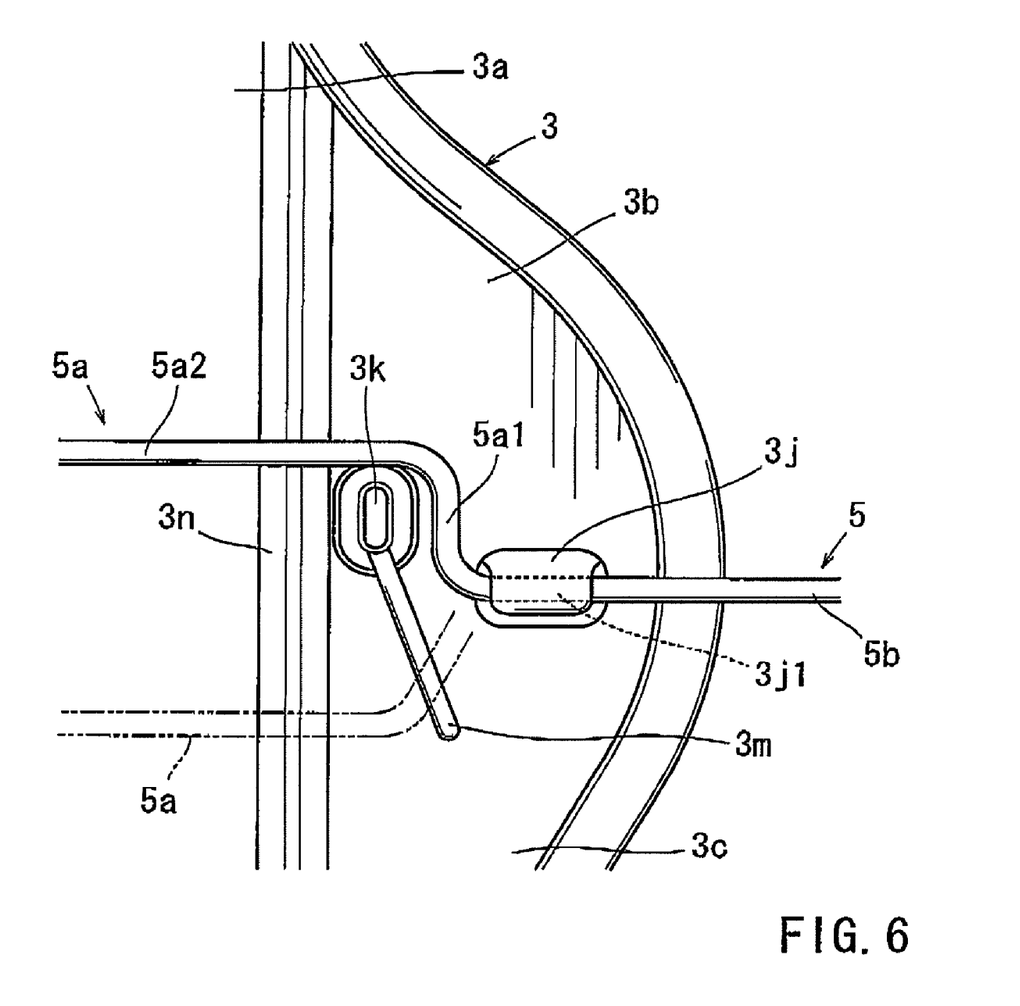
FIG. 6 is an enlarged view of a back of an elastic bridge member and a part of the plate member near right side of a bent portion of the elastic bridge member.

As shown in FIG. 2, the end portions 5c are connected to the side frames 2a and 2b, and are extended obliquely downward. The horizontal portions 5b extend substantially horizontally from the end portions 5c. The bent portion 5a is bent, as shown in FIG. 6, along the second plate portion 3b and toward the first plate portion 3a. The bent portion 5a has left and right rising portions 5a1 and a connecting portion 5a2. The rising portions 5a1 are extended upward from the horizontal portions 5b toward the first plate portion 3a. The connecting portion 5a2 extends substantially horizontally, and connects the left and right rising portions 5a1.

As a result, the elastic bridge member 5 can elastically support the second plate portion 3b and movably in a forward and backward direction. Moreover, the elastic bridge member 5 has the bent portion 5a so that it can support such a force as is applied to the first plate portion 3a with a torsional force.

On the back of the second plate portion 3b, as shown in FIGS. 2 and 6, there are formed hook portions 3j and positioning portions 3k for holding the elastic bridge member 5. The hook portions 3j have opening portions 3j1, into which the horizontal portions 5b of the elastic bridge member 5 are inserted from the lower side. The positioning portions 3k are protruded from the inner sides of the corners of the rising portions 5a1 and the connecting portion 5a2 of the elastic bridge member 5. As a result, the hook portions 3j and the positioning portions 3k regulate vertical movements of the elastic bridge member 5. Moreover, the paired positioning members 3k regulate transverse movements of the elastic bridge member 5. Thus, the elastic bridge member 5 can be stably held on the plate member 3.

The second plate portion 3b has erroneous assembly preventing projections 3m formed on their backs, as shown in FIGS. 2 and 6. The erroneous assembly preventing projections 3m are formed at the lower side positions of the positioning portions 3k, thus extending obliquely downward from the positioning portions 3k. When the elastic bridge member 5 is assembled with the second plate portion 3b, the erroneous assembly preventing projections 3m can prevent the bent portion 5a from coming into the state toward the third plate portion 3c. Thus, the elastic bridge member 5 can be correctly assembled with the second plate portion 3b by utilizing the erroneous assembly preventing projections 3m.

As shown in FIG. 2, the elastic bridge member 5 extends across the left and right ribs 3n. As a result, the elastic bridge member 5 is positioned backward of the open hole 3f1 by a distance at least equal to the height of the ribs 3n. In case the plate member 3 is elastically deformed, therefore, the elastic bridge member 5 is prevented from pushing the thoracic vertebrae of the user through the open hole 3f1.

The elastic bridge member 6 is disposed along the rib 3h of the fourth plate portion 3d, as shown in FIG. 2. The elastic bridge member 6 includes a pair of coil springs 6a and a wire 6b, as shown in FIGS. 2 and 5. The ends of the paired coil springs 6a are connected to the side frames 2a and 2b. Moreover, a holding portion 6d for holding the leading end of the wire 6b is attached to the other end portion of one coil spring 6a. To the other end portion of the other coil spring 6a, there is attached an outer tube 6c, into which the wire 6b is inserted. Moreover, the wire 6b is tensed between the paired coil springs 6a.

The wire 6b and the outer tube 6c are arranged in the vehicular seat 10, as shown in FIG. 1, and are connected (at one of the end portions) to a take-up portion 13. This take-up portion 13 is mounted on the side portion of the seat cushion 11, and takes up the wire 6b with respect to the outer tube 6c, when clockwise turned on its axis, but releases the wire 6b with respect to the outer tube 6c when counter-clockwise turned on its axis. As a result, the wire 6b between the paired coil springs 6a is adjusted on its length by the take-up portion 13. Therefore, the total length of the lumbar elastic bridge member 6 is adjusted by adjusting the length of the wire 6b.

Here, the plate member 3 is positionally retained, as shown in FIG. 2, at its upper end portion by the elastic bridge member 5 and at its lower end portion by the pawls 3e2. As a result, the plate member 3 is substantially supported at its front and back positions by the elastic bridge member 5 and the pawls 3e2. On the other hand, the coil springs 6a of the lumbar elastic bridge member 6 are attached to the seat back frame 2, thus being positioned on the forward side of the elastic bridge member 5 and the pawls 3e2. As a result, the lumbar elastic bridge member 6 can be shortened to push the fourth plate portion 3d forward. Moreover, the lumbar elastic bridge member 6 can be elongated to move the fourth plate portion 3d backward. As a result, the elastic bridge member 5 can deform the plate member 3 to adapt the body shape of the user.

In the lumbar elastic bridge member 6 thus adjusted in length, the coil spring 6a is elastically deformed to move the plate member 3 forward and backward. Moreover, the plate member 3 and the elastic support mechanism 4 are shielded with a protective plate 9 covering the back of the seat back 1, as shown in FIG. 5.

Accordingly, the plate member 3 has the thoracic vertebra avoiding portion 3f having the open holes 3f1 and 3f2 and the recessed portion 3f3, as shown in FIG. 3, so that it may be avoided from pushing the thoracic vertebrae of the user seated on the vehicular seat 10. Moreover, the thoracic vertebra avoiding portion 3f is vertically elongated at the substantially widthwise center position of the plate member 3, and is given the width of 40 to 100 mm.

A result of providing holes 3f1 and 3f2 and the recessed portion 3f3, is a reduction or elimination of a strong pushing force of the plate member 3 onto the thoracic vertebrae of the user. Moreover, the thoracic vertebra avoiding portion 3f is vertically elongated at the substantially widthwise center position, and is given the width of 40 to 100 mm. Therefore, the strong pushing force to the thoracic vertebrae of the user can be sufficiently suppressed to improve the riding confortableness of the vehicular seat 10.

The thoracic vertebra avoiding portion 3f is provided, as shown in FIG. 3, with the open holes 3f1 and 3f2 at the upper and lower positions, and with the recessed portion 3f3 between the open holes 3f1 and 3f2. Therefore, the formations of the open holes 3f1 and 3f2 reduce the weight of the plate member 3. Moreover, the formations of the open holes 3f1 and 3f2 and the recessed portion 3f3 reduce the pushing force sufficiently on the thoracic vertebrae. Further, the formation of the recessed portion 3f3 between the upper and lower open holes 3f1 and 3f2 makes it possible to prevent the plate member 3 from being largely deformed. Specifically, holes 3f1 and 3f2 of the plate member 3 can be prevented from being largely deformed. As a result, the recessed portion 3f3 intensifies the strength of the plate member 3.

As shown in FIG. 3, the ribs 3n, which vertically extend along the thoracic vertebra avoiding portion 3f, are formed at the left and right positions of the thoracic vertebra avoiding portion 3f. As a result, the plate member 3 is reinforced by the ribs 3n, although it might otherwise be made weaker around the thoracic vertebra avoiding portion 3f (as compared to the remaining portions) because the thoracic vertebra avoiding portion 3f includes holes 3f1 and 3f2. Moreover, the ribs 3n vertically extend at the left and right positions of the thoracic vertebra avoiding portion 3f, thus reinforcing the plate member 3 reliably and efficiently around the thoracic vertebra avoiding portion 3f.

On the other hand, the elastic support mechanism 4 is provided, as shown in FIG. 2, with the paired elastic bridge members 5 and 6, which are horizontally bridged over the seat back frame 2 on the upper back and the lower back of the plate member 3. Moreover, the ribs 3n are extended to the paired elastic bridge members 5 and 6. As a result, the force applied to one of the elastic bridge members 5 and 6 can be transmitted to the other of the elastic bridge members 5 and 6 by the ribs 3n. Therefore, the concentration of the force at the portions of the elastic support mechanism 4 and the plate member 3 can be avoided by the ribs 3n.

While the invention has been described with reference to specific configuration, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configuration, but may be modified as described below.

In FIG. 2, the elastic bridge members 5 and 6 are bridged over or extend between sides of the seat back frame 2. However, the elastic support mechanism may also have a spring for connecting the end portion of the plate member and the seat back frame.

In FIG. 2, the elastic bridge members 5 and 6 are horizontally bridged over or extend horizontally between sides of the seat back frame 2. In another configuration, however, the elastic bridge members may be vertically bridged over the seat back frame.

In FIG. 5, the lumbar elastic bridge member 6 is adjusted in its length to adjust the position of the fourth plate portion 3d forward and backward. However, another configuration may also be modified into a positionally unadjustable one, in which the lumbar elastic bridge member is identical to the rod-shaped elastic bridge member 5.

In FIG. 3, the thoracic vertebra avoiding portion 3f is provided with the open holes 3f1 and 3f2 at its upper and lower positions and the recessed portion 3/3 at its center position. However, the configuration may also be modified such that the thoracic vertebra avoiding portion is formed to have only an opening, such that the same is formed to have only a recessed portion, or such that the same is formed to have three or more open holes and recessed portions positioned between the open holes.

In FIG. 2, the elastic support mechanism 4 has the paired elastic bridge members 5 and 6. However, the elastic support mechanism is provided with three or more elastic bridge members.

This invention claims:

1. A seat back for a vehicular seat comprising:
   a plate member for supporting a back of a pad; and
   an elastic support mechanism capable of elastically holding the plate member for moving the plate member forward and backward with respect to a seat back frame,
   wherein the plate member includes a thoracic vertebra avoiding portion having at least one of an open hole and a recessed portion recessed in a direction away from a thoracic vertebrae of a user seated on the vehicular seat, so as to avoid a pushing force to the thoracic vertebrae,
   wherein the thoracic vertebra avoiding portion is vertically elongated at a substantially widthwise center position of the plate member and has a width of 40 to 100 mm,
   wherein the thoracic vertebra avoiding portion includes an upper hole and a lower hole, further wherein the recessed portion is positioned between the upper hole and the lower hole,
   wherein the elastic support mechanism includes a plurality of elastic bridge members bridged horizontally over the seat back frame,
   wherein one of the elastic bridge members is longitudinally adjustable and is able to adjust a position of a portion of the plate member in a forward and backward direction,
   wherein the plate member includes a rib extending horizontally at a lower portion thereof with respect to the thoracic vertebra avoiding portion, and
   wherein the longitudinally adjustable elastic bridge member is disposed along the rib extending horizontally.

2. The seat back as in claim 1, wherein the plate member includes a rib extending in an up and down direction on at least one side of right and left sides of the thoracic vertebra avoiding portion.

3. The seat back as in claim 2, wherein the plurality of elastic bridge members is a pair of elastic bridge members connected to an upper portion and a lower portion of the plate member and extend horizontally between ends of the seat back frame, further wherein the rib extending in the up and down direction extends perpendicular to the paired elastic bridge members.

4. The seat back as in claim 1, wherein the plate member is molded of a composite material containing a polyamide resin and glass fibers.

5. A vehicular seat comprising:
   a seat back including:
      a frame;
      a plate member connected to the frame, wherein the plate member includes a thoracic vertebra avoiding portion having a first hole, a second hole and a recessed portion recessed in a direction away from a thoracic vertebrae of a user to avoid a pushing force to the thoracic vertebrae, further wherein the recessed portion is positioned between the first and second holes, further wherein the thoracic vertebra avoiding portion is vertically elongated at a substantially widthwise center position of the plate member and has a width of 40 to 100 mm, further wherein the plate member includes a rib extending horizontally at a lower portion thereof with respect to the thoracic vertebra avoiding portion; and
   an elastic support mechanism capable of elastically holding the plate member for moving the plate member forward and backward, wherein the elastic support mechanism includes first and second elastic bridge members, further wherein the first and second elastic bridge members extend from each side of the frame, further wherein the second elastic bridge member is horizontally adjustable and is able move the lower portion of the plate member in a forward and backward direction, further wherein the second elastic bridge member is disposed along the rib of the plate member.

6. The seat as in claim 5, wherein the plate member includes a first rib and a second rib, further wherein the first rib and second rib extend vertically on either side of the thoracic vertebra avoiding portion.

7. The seat as in claim 6, wherein the first and second ribs extend perpendicular to the first and second elastic bridge members.

8. The seat as in claim 5, wherein the plate member is molded of a composite material containing a polyamide resin and glass fibers.

* * * * *